United States Patent [19]

Gratzel et al.

[11] 4,389,290
[45] Jun. 21, 1983

[54] USE OF ELECTROCATALYTIC ANODES IN PHOTOLYSIS

[75] Inventors: Michael Gratzel, Vaud; Michael Neumann-Spallart, Lausanne, both of Switzerland

[73] Assignee: Engelhard Corporation, Iselin, N.J.

[21] Appl. No.: 279,908

[22] Filed: Jul. 2, 1981

[30] Foreign Application Priority Data

Jul. 8, 1980 [GB] United Kingdom ............... 8022342

[51] Int. Cl.³ .................. C25B 1/04; C25B 1/26; C25B 11/08; C25B 11/10
[52] U.S. Cl. .................. 204/128; 204/129; 204/290 R; 204/290 F; 204/291; 204/292; 204/252; 204/157.1 R; 429/111
[58] Field of Search .................. 204/128, 129, 290 R, 204/290 F, 291, 292, 157.1 W, 252; 429/111

[56] References Cited

U.S. PATENT DOCUMENTS 4,011,149  3/1977  Nozik ................. 204/129
4,090,933  5/1978  Nozik ................. 204/129

OTHER PUBLICATIONS

"O₂ Generated from H₂O Photochemically", C & EN, Jul. 23, 1979, pp. 24–25.

*Primary Examiner*—R. L. Andrews

[57] ABSTRACT

A photolytic system comprised of a darkened halfcell and an illuminated halfcell in which oxidation and reduction reactions are made to occur. These halfcells are joined by an electrically conductive element and an ion conducting junction for electron transfer and ion transport. The illuminated halfcell is equipped with a cathode and the darkened halfcell contains an improved anode which exhibits a desirably low overvoltage with respect to the substrate which is sought to be oxidized. Oxidation products are formed at the anode and reduction products are formed at the cathode.

32 Claims, 1 Drawing Figure

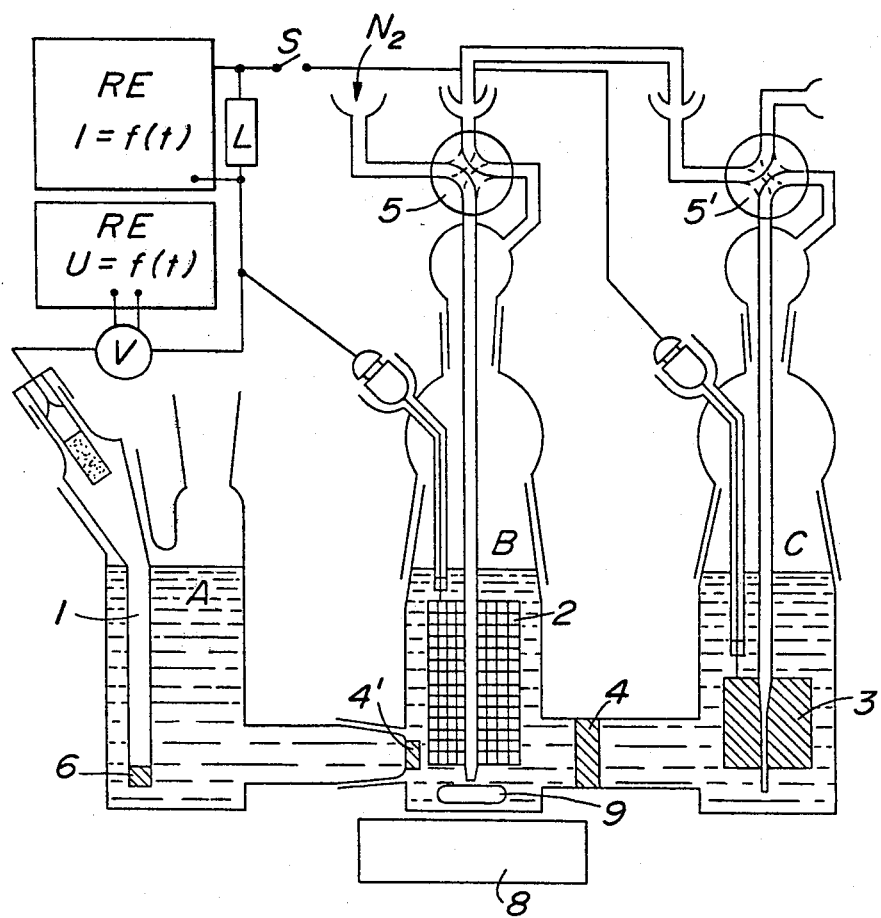
FIG. I

USE OF ELECTROCATALYTIC ANODES IN PHOTOLYSIS

This invention relates to a photolytic system for converting substrates into energy-storing compounds by the action of visible light.

The device in which this system is conducted consists essentially of: (1) a darkened halfcell containing an anode and an oxidizable substrate; (2) an illuminated halfcell containing a composition which under the action of visible light exhibits an enhanced ability to donate electrons, a cathode, an electron relay which accepts electrons, a catalyst for mediating an oxidation-reduction process and an oxidizeable or reducible substrate; and (3) means for transporting electrons and ions between the illuminated halfcell and the darkened halfcell. The system is improved by virtue of the anode being comprised of an anodic catalyst positioned in the darkened halfcell to mediate oxidation-reduction, the anodic catalyst being selected from the group consisting of:

(a) ruthenium oxide, (b) iridium oxide, (c) ruthenate salts, (d) iridate salts, and mixtures of two or more thereof. The anodic catalyst made also include one or more of transition metal oxides, rare earth metal oxides, aluminum oxides, silicon oxide and thorium oxide.

In one aspect of the invention, the electron donating composition in the illuminated halfcell is a photosensitizer, and in another aspect of the invention it is a semiconductor. The semiconductor may serve as the cathode in another aspect of the invention.

The present invention also provides a photolytic method for the endoergic production of oxidation and reduction products which comprises illuminating a halfcell containing a composition which, under the action of visible light, exhibits an enhanced ability to donate electrons, a cathode, an electron relay which accepts electrons, a catalyst for mediating an oxidation-reduction process and an oxidizable or reducible substrate; simultaneously transporting electrons and ions between the illuminated halfcell and a darkened halfcell which contains an oxidizable or reducible substrate and an anode comprised of an anodic catalyst positioned in the darkened halfcell to mediate oxidation-reduction, the anodic catalyst being as described above, and recovering the oxidation and reduction products.

The oxidation of the substrate takes place in the darkened halfcell and the reduction of the substrate takes place in the illuminated halfcell.

This invention covers both photochemical-type processes and those which employ semiconductors. In the photochemical process the darkened halfcell contains a cathode and a photosensitizer for the absorption of visible light. However, in the semiconductor-type process said cathode and said photosensitizer are replaced by a chemical composition which donates electrons when subjected to visible light irradiation.

In the photochemical process the photosensitizer becomes oxidized as a result of the visible light irradiation and this oxidized material is reconverted to its reduced state for recycling purposes via the transfer of electrons from the dark halfcell to the illuminated halfcell through an external circuit.

In the process hereinafter described, the "darkened" halfcell is the one which is not necessarily subjected to visible light irradiation. However, the system may be operated with the darkened cell irradiated as well as the illuminated cell or with the darkened cell under ambient conditions, that is, it may be exposed to room or atmospheric light. Alternatively, the darkened halfcell may be made light-impermeable by shielding it from visible light rays via the use of a cover or other known means.

BACKGROUND

It is known that water can be converted into usable fuels. Moreover, it exists in such abundance that it is sometimes viewed as a feedstock for fuels of the future. The photolytic production of hydrogen and oxygen from water is technologically feasible and it is believed to represent the ultimate solution to the world's energy problems. This conversion can be illustrated by the following oxidation and reduction reactions.

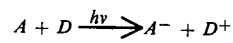

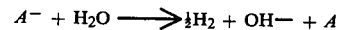

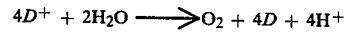

wherein a photosensitizer (D) absorbs visible light and thereby reduces an electron relay A to $A^-$ with a concomitant oxidation of D to $D^+$. Subsequently, the reduced relay $A^-$ releases hydrogen from water while it is simultaneously oxidized to A in a catalyst mediated process. Meanwhile, electrons provided by water reduce the oxidized photosensitizer ($D^+$) back to D with a simultaneous generation of oxygen.

In copending application Ser. No. 184,460 filed Sept. 5, 1980, now abandoned, which was continued into application Ser. No. 375,913 filed May 7, 1982 we demonstrate that metal oxides can be used to mediate the production of oxygen from aqueous solutions. Specifically, it was demonstrated that the combination of ruthenium oxide in its colloidal or macrodispersed form with colloidal platinum, a sensitizer such as Ru(bipy)$_3^{+2}$ and an electron relay such as methylviologen mediates the photochemical dissociation of water into hydrogen and oxygen. This system produces hydrogen and oxygen simultaneously as a gaseous mixture thus requiring a separation of the said gases. Moreover, cross reactions add to the cost and complexity of the system.

In copending application Ser. No. 292,966 filed Aug. 14, 1981, as a continuation of application No. 184,610 filed Sept. 5, 1980 the gaseous mixture problem was overcome by generating and collecting the hydrogen and oxygen in separate compartments, that is, in separate halfcells.

This invention provides an improved anode for use in systems comprised of two halfcells or compartments connected by electrodes and a conductive bridge for ion transport. The halfcell containing the anode is operated as a darkened halfcell, that is, it is not necessary to irradiate it with visible light. The halfcell containing the cathode is light permeable and it is operated under visible light irradiation.

One object of this invention is to provide an improved anode for the photolytic production of oxidized substrates. These anodes exhibit a low overvoltage with respect to the substrate which is sought to be oxidized.

This invention demonstrates that light-induced redox reactions occurring in one compartment of the cell system can be coupled to oxidation processes in the other compartment. Conversely, oxidation products formed at the anode are in a stoichiometric relationship to the current which is generated in the electron conductive element.

A further object is the reconversion of the oxidized species (D+) to its original or reduced form (D). This is achieved via the transfer of electrons from the anodic compartment where substrate oxidation occurs to the cathodic halfcell. This transfer is effected via an external circuit or conductive element which joins one electrode to the other. The recycling of sensitizer (D) lends economy to the process.

The available alternatives on the cathodic side are determined by the nature and function of the sensitizer (electron donor) and electron relay (electron acceptor).

The sensitizer provides three possibilities. It may be present in the cathodic compartment as a dissolved species in solution; it may be adsorbed on the cathode surface or, in the third situation, the sensitizer may be present as a photoexcitable semiconductor material which functions per se as the cathode. Suitable semiconductors include, for example, p-type gallium phosphide (p-GaP), gallium arsenide and silicon.

The electron relay may be a sacrificial species which is irreversibly reduced during the photo-redox process or it may be regenerated and continuously recycled.

In a process which provides for regeneration the sensitizer and relay may be coupled catalytically to the Noble metals as, for examle, colloidal platinum, ruthenium, palladium, rhodium, gold and silver are particularly suitable for this purpose.

The selection of a suitable anode for the anodic side of the system is critical to the process. Specifically, we have discovered that overall cell efficiency is enhanced by utilizing an anode which possesses a low over-voltage with respect to the substance which is sought to be oxidized. Anodes found suitable for this purpose are electrocatalyst anodes, i.e., anodic catalysts such as (a) ruthenium oxide, (b) iridium oxide, (c) ruthenate salts, (d) iridate salts, and mixtures of two or more thereof. The anodic catalyst may optionally also include (e) transition metal oxides, (f) rare earth metal oxides, (g) aluminum oxide, (h) silicon oxide and (i) mixtures of two or more thereof. In compositions comprising the oxides (e)-(i) the ruthenium and iridium components (a)-(d) generally constitute no less than about 50% by weight of the total composition and, preferably, no less than about 75% by weight.

The rughenium oxides of this invention are compounds of the formula: $RuO_x$ wherein x is an integer having a value of 1.5-2.0.

Transition metal oxides and rare earth metal oxides which may be used in combination with the oxides and salts of ruthenium and iridium include, for example, the oxides of tungsten, zirconium, tantalum, titanium, chromium, vanadium, iron, nickel, cobalt and manganese. Preferred among these transition metals are di-tantalum pentoxide and zirconium oxide.

In addition to the electrocatalyst functioning per se as the anode this invention includes anodes in which the said electrocatalyst is coated as a layer on a conductive support. Typical of such anodes are, for example, titanium or platinum coated with ruthenium containing compositions such as ruthenium oxides, ruthenates, lanthanum ruthenate ($LaRuO_3$) and lead ruthenate ($PbRuO_3$), iridium containing compositions such as iridates, for example, lanthanum iridates or lead iridates ($LaIrO_3$, $PbIrO_3$) or iridium oxides and mixtures of ruthenium oxide or iridium oxide with transition metal oxides such as titanium or tantalum oxides such as ditantalum pentoxide or zirconium oxide and the like.

Other conductive materials which may be used as a support for the oxides and salts of ruthenium and iridium are graphite silica and the oxides of alumina, chromia, chloria and thorium or mixtures of same, with the proviso that at least one of the oxides and salts of ruthenium and iridium are present in the combination.

The coated anodes are prepared by depositing a 1-5 $\mu m$ layer of the electrocatalyst on the desired support, although a 2-4 $\mu m$ layer is deemed economically preferable. Thus, according to one aspect of this invention a particularly suitable anode was prepared by depositing a thin 2 $\mu m$ layer of ruthenium oxide on a 0.3 mm thick plate of titanium having a total surface area of 8 $cm^2$.

THE DRAWING

The cell in this system is illustrated by FIG. 1 and consists of Compartments A, B and C. Compartment A contains a standard calomel electrode (SCE) 1 equipped with a porous disc 6. Compartment B contains a platinum gauze cathode 2 and Compartment C contains a ruthenium oxide anode 3. The Compartments A, B and C are interconnected by means of porous discs 4 and 4', with disc 4 being located between Compartments B and C and disc 4' being located between Compartments A and B. The porous disc arrangement provides means for transporting ions between the Compartments. A switch S is provided so that the system can be operated under open or closed circuit conditions. A magnetic stirring unit 8 is arranged to activate an impeller 9 to effect the mixing of the solution of Compartment B.

As shown in FIG. 1 the system is electrically connected so that the standard calomel electrode 1 serves as a reference electrode to measure the potential of the platinum electrode (cathode). To this end, there is provided a high impedance voltmeter V. The voltage-time function $U = f(t)$ and current-time function $I = f(h)$ across a ten ohm load resistance L are provided by recorders RE. A measurement of voltage-time function $U = f(t)$ and current-time functions $I = f(t)$ is provided via a high impedance voltmeter V and recorders RE across a 10 ohm load.

Prior to operation of the system, Compartments B and C are cleansed of oxygen to a level of less than one part per million by passing highly purified nitrogen gas through the solutions therein. To this end, there is provided a stopcock 5 associated with Compartment B and a stopcock 5' associated with Compartment C. Stopcocks 5 and 5' are provided with four-way valve members and are movable between the solid line and the dashed line positions shown in FIG. 1. In th solid line position, stopcock 5 directs the nitrogen gas into the bottom of Compartment B and discharges gas from the top of Compartment B to a bridge conduit connected to stopcock 5'. In the dashed line position, stopcock 5 directs the nitrogen gas directly to the bridge conduit for delivery to stopcock 5' which, when in its dashed line position, directs the nitrogen gas into the bottom of Compartment C for cleansing thereof.

It will be apparent that stopcocks 5 and 5' can also be positioned to either discharge or trap gases in the Compartments B and C, as desired.

In one mode of operating the system shown in FIG. 1, the stopcocks 5 and 5' are positioned in their closed position to trap the gases produced in Compartments B and C. Thereupon, the solution in Compartment B is irradiated with a 150 watt slide project lamp (not shown) while monitoring the light-induced changes in the cell current and voltage. The gases evolved in the cell Compartments B and C are transferred to appropriate analyzers (not shown) by appropriate adjustment of the settings of stopcocks 5 and 5'. The collected gases are then subjected to quantitative analysis.

This invention will now be described with particularity by reference to specific embodiments.

EXAMPLE 1

RuO$_2$/Ti Anode; Sacrificial Acceptor

The system of FIG. 1 was equipped with an aqueous solution of Na$_2$SO$_4$(1M) in Compartment A, an aqueous solution of Ru(bipy)$_3^{+2}$ 2 Cl$^-$(10$^{-4}$M) and K$_2$S$_2$O$_8$(10$^{-2}$M) in Compartment B and an aqueous solution of Na$_2$SO$_4$(1M) buffered to pH 4.7 with sodium acetate in Compartment C.

Prior to illumination the potential between the platinum gauze electrode and the standard calomel electrode was measured at approximately 0.5 mV.

A 150 W projector lamp was used to illuminate the solution in Compartment B. The photopotential rose within a few seconds to approximately 1.0 V (vs calomel) with a concomitant increase of cell current to 250 μA. With a few minutes the current rose to 325 μA and this value was maintained throughout a one-hour irradiation period.

Upon removal of the lamp the current declined sharply. The cathodic photo-current observed at the platinum gauze electrode is attributed to the reduction of Ru(bipy)$_3^{+3}$ produced via an illuminated photo-redox process:

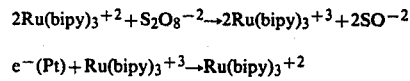

This Ru(bipy)$_3^{+3}$ conversion continues in the cathode compartment so long as S$_2$O$_8^{-2}$ acceptor is available.

At the same time, in the anode compartment an oxygen-generating reaction takes place. Coulometric analysis showed that this reaction is stoichiometric with four electrons being passed through the circuit for every oxygen molecule produced:

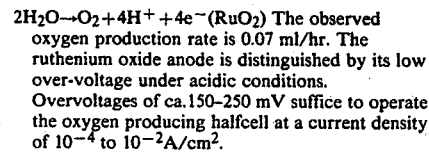

The power density of solar radiation averages ca 20mW/cm$^2$; therefore, this embodiment demonstrates that oxygen can be produced via the present system using sunlight as the power source.

EXAMPLE 2

Pt Anode; Sacrificial Acceptor

Following the procedure of Example 1 but replacing the RuO$_2$ coated titanium electrode in Compartment C with a platinum gauze electrode, no cell current or oxygen generation is observed when Compartment B is illuminated.

EXAMPLE 3

RuO$_2$/Ti Anode; Simultaneous H$_2$ and O$_2$ Production

Following the procedure of Example 1 but replacing the solution in Compartment B with 0.1N H$_2$SO$_4$ containing Ru(bipy)$_3^{+2}$ 2 Cl$^-$(10$^{-4}$M) as a photosensitizer, methylviologen (5×10$^{-2}$M) as an electron relay and a ctalyst, finely divided Pt (25-35Å diameter; 20 mg/l) stabilized with Carbowax 20M ® (140 mg/l); and the solution in Compartment C with 1N H$_2$SO$_4$ and separating Compartments B and C with a proton conducting (Nafion ®) membrane, an increase of potential at the Pt electrode from 0.5 to 1.02 V (SCE) is observed upon illumination. A current flow of 200 μA is obtained under photostationary conditions.

Analyses of the gases produced at the cathode and anode indicate that they are hydrogen and oxygen, respectively. The gases are produced at a rate consistent with the observed cell current.

EXAMPLE 4

RuO$_3$/Ti Anode; Simultaneous H$_2$ and Cl$_2$ Production

Following the procedure of Example 3 but replacing the 0.1N H$_2$SO$_4$ in Compartments B and C with 1M HCl, a current of 150 μA is observed when the cathode compartment is illuminated with a 150 W slide projector lamp. The gas formed at the anode is identified as Cl$_2$ and its formation is followed iodometrically. Hydrogen is evolved at the cathode.

The gases are produced at a rate consistent with the observed photostationary cell current.

EXAMPLE 5

RuO$_2$/Ti Anode; Simultaneous H$_2$ and O$_2$ Production

Following the procedure of Example 3 but replacing Ru(bipy)$_3^{+2}$ 2 Cl$^-$ with zinc tetramethylpyridinium porphyrin (5×10$^{-5}$M), methylviologen with betaine viologen (5×10$^{-3}$M) and the catalyst with finely divided Pt (25-35 Å; 20 mg/l) stabilized with lauryl sulfate (10$^{-2}$M), a current flow of 200 μA is obtained under photostationary conditions.

Analysis of the gases produced at the cathode and anode show them to be hydrogen and oxygen, respectively.

The gases are produced at a rate consistent with the observed cell current.

EXAMPLE 6

RuO$_2$/Ti Anode; Simultaneous H$_2$ and O$_2$ Production

Following the procedure of Example 3 but replacing Ru(bipy)$_3^{+2}$ 2 Cl$^-$ with zinc tetra-N-octadecyl-pyridinium porphyrin (10$^{-5}$M) which is adsorbed at the Pt electrode in Compartment B, a photocurrent of 40 A is observed when the Pt electrode is illuminated with a 150 W slide projector lamp.

Analysis of the gases produced at the cathode and anode show them to be hydrogen and oxygen, respectively. The gases are produced at a rate consistent with the observed cell current.

EXAMPLE 7

RuO$_2$/Ti Anode; Simultaneous H$_2$ and O$_2$ Production

The procedure of Example 3 is followed except that the Pt cathode is replaced with a semiconducting electrode consisting of p-type gallium phosphide (p-GaP). This electrode is connected to the RuO$_2$/Ti anode through an external bias voltage source held at 600 mV. The sensitizer Ru(bipy)$_3^{+2}$ 2Cl$^-$ is omitted in this instance. The concentration of methylviologen is 10$^{-2}$M. Illumination of the p-GaP electrode produces a current of 5 A.

Analysis of gases produced at the cathode and anode show them to be hydrogen and oxygen, respectively. The gases are produced at a rate consistent with the observed cell current.

What is claimed is:

1. A photolytic sysem for the production of oxidation and reduction products which comprises: (1) a darkenable halfcell containing an anode and an oxidizable substrate; (2) an illuminatable halfcell containing a composition which under the action of visible light exhibits an enhanced ability to donate electrons, a cathode, an electron relay which accepts electrons, a catalyst for mediating an oxidation-reduction process and an oxidizable or reducible substrate; and (3) means for transporting electrons and ions between said illuminatable halfcell and darkenable halfcell; wherein the anode is an anodic catalyst and is selected from the group consising of: (a) ruthenium oxide, (b) iridium oxide, (c) ruthenate salts, (d) indate salts, and mixtures of two or more thereof.

2. The system according to claim 1 wherein the anodic catalyst includes one or more of transition metal oxides, rare earth metal oxides, aluminum oxides, silicon oxide and thorium oxide.

3. The system according to claim 1 wherein the electron donating composition in the illuminatable halfcell is a photosensitizer.

4. The system according to claim 1 wherein the electron donating composition in the illuminatable halfcell is a semiconductor.

5. The system according to claim 4 wherein the semiconductor is the cathode.

6. The system according to claim 2 wherein the transition metal oxide or rare earth metal oxide is selected from the group consisting of oxides of tungsten, zirconium, tantalum, titanium, chromium, vanadium, iron, nickel, cobalt and manganese.

7. The system according to claim 6 wherein the transition metal oxide is selected from the group consisting of oxides of tantalum, zirconium and titanium.

8. The system according to claim 1 wherein said anode comprises a conductive support onto which said anodic catalyst is coated.

9. The system according to claim 8 wherein said conductive support is titanium or platinum.

10. The system according to claim 1 wherein said anodic catalyst is ruthenium oxide.

11. The system according to claim 8 wherein said anode comprises ruthenium oxide coated onto titanium.

12. The system according to claim 2 in which the ruthenium oxide, iridium oxide, ruthenate salts, iridate salts, or mixtures thereof, are present in an amount of no less than about 50% by weight of said anodic catalyst.

13. A photolytic method for the endoergic production of oxidation and reduction products which comprises, illuminating a halfcell containing a composition which under the action of visible light exhibits an enhanced ability to donate electrons, a cathode, an electron relay which accepts electrons, a catalyst for mediating an oxidation, reduction process and an oxidizable or reducible substance; simultaneously transporting electrons and ions between said illuminated halfcell and a darkened halfcell which contains an oxidizable or reducible substance and an anode comprised of an anodic catalyst positioned in the darkened halfcell to mediate oxidation-reduction, said anodic catalyst being selected from the group consisting of:
(a) ruthenium oxide, (b) iridium oxide, (c) ruthenate salts, (d) iridate salts and mixtures thereof;
and recovering the oxidation and reduction products.

14. The method according to claim 13 wherein the anodic catalyst includes one or more transition metal oxides, rare earth metal oxides, aluminum oxides, silicon oxide or thorium oxide.

15. The method according to claim 13 wherein the electron-donating composition in the illuminated halfcell is a photosensitizer.

16. The method according to claim 13 wherein the electron-donating composition in the illuminated halfcell is a semiconductor.

17. The method according to claim 16 wherein the semiconductor is the cathode.

18. The method according to claim 14 wherein the transition metal oxide or rare earth metal oxide is selected from the group consisting of oxides of tungsten, zirconium, tantalum, titanium, chromium, vanadium, iron, nickel, cobalt and manganese.

19. The method according to claim 18 wherein the transition metal oxide is selected from the group consisting of oxides of tantalum, zirconium and titanium.

20. The method according to claim 13 wherein said anode comprises a conductive support onto which said anodic catalyst is coated.

21. The method according to claim 20 wherein said conductive support is titanium or platinum.

22. The method according to claim 13 wherein said anodic catalyst is ruthenium oxide.

23. The method according to claim 20 wherein said anode comprises ruthenium oxide coated onto titanium.

24. The method according to claim 14 in which the ruthenium oxide, iridium oxide, ruthenate salts, iridate salts or mixtures thereof are present in an amount of no less than about 50% by weight of said anodic catalyst.

25. The method according to claim 13 wherein oxidation occurs in the darkened halfcell and the reduction occurs in the illuminated halfcell.

26. The method according to claim 13 in which the substance is water and oxygen is produced in the darkened halfcell and hydrogen is produced in the illuminated halfcell.

27. The method according to claim 13 in which the substrate is an aqueous solution of hydrogen chloride and hydrogen is produced in the illuminated halfcell and chlorine is produced in the darkened halfcell.

28. The method according to claim 13 wherein the catalyst which is employed in the illuminated halfcell is stabilized finely dispersed platinum.

29. The method according to claim 15 in which said photosensitizer is a ruthenium tris bipyridyl cation or a metallo porphyrin.

30. The method according to claim 29 in which the said photosensitizer is ruthenium tris bipyridyl halide, zinc tetramethylpyridinium porphyrin cation or a zinc tetra-N-actadecylpyridinium porphyrin complex.

31. The method according to claim 13 in which the electron relay is methylviologen or betaine viologen.

32. The method according to claim 16 wherein said semiconductor is p-type gallium phosphide, gallium arsenide or silicon.

* * * * *